US 9,634,315 B2

(12) United States Patent
Hayner et al.

(10) Patent No.: US 9,634,315 B2
(45) Date of Patent: Apr. 25, 2017

(54) CARBON CONTAINING BINDERLESS ELECTRODE FORMATION

(71) Applicant: SiNode Systems, Inc., Chicago, IL (US)

(72) Inventors: Cary Michael Hayner, Chicago, IL (US); Saad Hasan, Chicago, IL (US); Joshua Jonathan Lau, Chicago, IL (US); Christine A. Frysz, Orchard Park, NY (US); Peter Jefferies Santos, Randolph, NJ (US)

(73) Assignee: SINODE SYSTEMS, INC., Chicago, IL (US)

(*) Notice: Subject to any disclaimer, the term of this patent is extended or adjusted under 35 U.S.C. 154(b) by 0 days.

(21) Appl. No.: 14/816,207

(22) Filed: Aug. 3, 2015

(65) Prior Publication Data

US 2016/0036035 A1 Feb. 4, 2016

Related U.S. Application Data

(60) Provisional application No. 62/032,505, filed on Aug. 1, 2014.

(51) Int. Cl.
*H01M 4/04* (2006.01)
*H01M 4/36* (2006.01)
(Continued)

(52) U.S. Cl.
CPC ....... *H01M 4/0471* (2013.01); *H01M 4/0404* (2013.01); *H01M 4/131* (2013.01);
(Continued)

(58) Field of Classification Search
CPC ............. H01M 4/0404; H01M 4/0409; H01M 4/0435; H01M 4/0471; H01M 4/131;
(Continued)

(56) References Cited

U.S. PATENT DOCUMENTS

| 7,745,047 | B2 | 6/2010 | Zhamu |
| 8,551,650 | B2 | 10/2013 | Kung et al. |
| 8,778,538 | B2 | 7/2014 | Kung et al. |
| 8,835,027 | B2 | 9/2014 | Thackeray et al. |
| 2003/0044608 | A1 | 3/2003 | Yoshizawa et al. |
| 2004/0248010 | A1 | 12/2004 | Kato et al. |
| 2007/0092432 | A1 | 4/2007 | Prud'Homme et al. |
| 2007/0111106 | A1 | 5/2007 | Kim et al. |
| 2008/0160420 | A1 | 7/2008 | Adachi et al. |
| 2009/0117466 | A1 | 5/2009 | Zhamu et al. |

(Continued)

FOREIGN PATENT DOCUMENTS

| CN | 101837972 A | 9/2010 |
| JP | 2004349164 A | 12/2004 |

(Continued)

OTHER PUBLICATIONS

Notification of Transmittal of International Search Report and Written Opinion of the International Searching Authority for PCT/US2015/043451, dated Nov. 18, 2015, 13 pages.

(Continued)

*Primary Examiner* — Brittany Raymond
(74) *Attorney, Agent, or Firm* — The Marbury Law Group PLLC (57) ABSTRACT

An anode or negative electrode having a material matrix of carbon, graphene and an active element such as silicon or tin is described. The electrode is fabricated from an electrode slurry that does not utilize an organic binder. The electrode slurry comprises a combination of silicon and graphene oxide suspensions that is applied to a surface of a substrate such as a current collector. The layer of electrode slurry is heat treated to ensure adhesion of the layer of active electrode material to the surface of the current collector. The electrode may be incorporated within a lithium ion electrochemical cell.

24 Claims, 3 Drawing Sheets

(51) Int. Cl.

| | | |
|---|---|---|
| H01M 4/38 | (2006.01) | |
| H01M 4/48 | (2010.01) | |
| H01M 4/583 | (2010.01) | |
| H01M 10/0525 | (2010.01) | |
| H01M 4/131 | (2010.01) | |
| H01M 4/133 | (2010.01) | |
| H01M 4/1391 | (2010.01) | |
| H01M 4/1393 | (2010.01) | |
| H01M 4/485 | (2010.01) | |
| H01M 4/587 | (2010.01) | |
| H01M 4/62 | (2006.01) | |

(52) U.S. Cl.
CPC ......... *H01M 4/133* (2013.01); *H01M 4/1391* (2013.01); *H01M 4/1393* (2013.01); *H01M 4/364* (2013.01); *H01M 4/485* (2013.01); *H01M 4/587* (2013.01); *H01M 4/62* (2013.01); *H01M 4/625* (2013.01); *H01M 4/0409* (2013.01); *H01M 4/0435* (2013.01)

(58) Field of Classification Search
CPC .. H01M 4/133; H01M 4/1391; H01M 4/1393; H01M 4/364; H01M 4/485; H01M 4/587; H01M 4/625; Y02E 60/122
See application file for complete search history.

(56) References Cited

U.S. PATENT DOCUMENTS

| | | | |
|---|---|---|---|
| 2009/0117467 A1* | 5/2009 | Zhamu | H01M 4/133 429/231.8 |
| 2009/0169725 A1 | 7/2009 | Zhamu et al. | |
| 2011/0111303 A1 | 5/2011 | Kung et al. | |
| 2013/0330618 A1 | 12/2013 | Sakai et al. | |
| 2014/0015160 A1 | 1/2014 | Kung et al. | |
| 2014/0170484 A1 | 6/2014 | Fukahori | |

FOREIGN PATENT DOCUMENTS

| | | |
|---|---|---|
| JP | 2009511415 A | 3/2009 |
| JP | 2011503804 A | 1/2011 |
| JP | 2011076931 A | 4/2011 |
| KR | 101400994 B1 | 5/2014 |
| WO | WO 2011057074 A2 | 5/2011 |

OTHER PUBLICATIONS

Lee et al., "Silicon Nanoparticles-Graphene Paper Composites for Li Ion Battery Anodes," Chem. Commun., vol. 46, (2010) pp. 2025-2027.

Kovtyukhova et al., "Layer-by-Layer Assembly of Ultrathin Composite Films for Micron-Sized Graphite Oxide Sheets and Polycations," Chem. Mater., vol. 11 (1999), pp. 771-778.

SIPO, Office Action, Chinese Application No. 201180070689.X, issued Jun. 18, 2015, 9pgs.

JPO, Office Action, Japanese Application No. JP2014510287, issued Feb. 10, 2015, 5pgs.

Extended Supplemental European Search Report, EP Application No. 11864999.5, issued Oct. 13, 2014.

Du et al., "Graphene Nanosheets as Electrode Material for Electric Double-Layer Capacitors," Electrochimica Acta, vol. 55 (2010), pp. 4812-4819.

Guo et al., "Electrochemical Performance of Graphene Nanosheets as Anode Material for Lithium-ion Batteries," Electrochemistry Communications, vol. 11 (2009), pp. 1320-1324.

Chou et al., "Enhanced Reversible Lithium Storage in a Nanosize Silicon/Graphene Composite," Electrochemistry Communications, vol. 12 (2010), pp. 303-306.

Xiang et al., "Graphene/nanosized Silicon Composites for Lithium Battery Anodes with Improved Cycling Stability," Carbon, vol. 49 (2011), pp. 1787-1796.

Tarascon et al., "Issues and Challenges Facing Rechargeable Lithium Batteries," Nature, vol. 414 (2001), pp. 359-367.

Armand et al., "Building Better Batteries," Nature, vol. 451 (2008), pp. 652-657.

Paek et al., "Enhanced Cyclic Performance and Lithium Storage Capacity of SnO2/Graphene Nanoporous Electrodes with Three-Dimensionally Delaminated Flexible Structure," Nano Letters, vol. 9, No. 1 (2008), ps. 72-75.

Yang et al., "Fabrication of Graphene-Encapsulated Oxide Nanoparticles: Towards High-Performance Anode Materials for Lithium Storage," Agnew. Chem. Int. Ed., vol. 49, No. 45 (2010), pp. 8408-8411.

Wu et al., "Graphene Anchored with Co2O4 Nanoparticles as Anode of Lithium Ion Batteries with Enhanced Reversible Capacity and Cyclic Performance," ACS Nano, vol. 4, No. 6 (2010), pp. 3187-3194.

Pan et al., "Li Storage Properties of Disordered Graphene Nanosheets," Chem. Mater., vol. 21, No. 14 (2009), pp. 3136-3142.

Banhart et al., "Structural Defects in Graphene," ACS Nano, vol. 5, No. 1 (2011), pp. 26-41.

Hummers et al., "Preparation of Graphitic Oxide," J. Am. Chem. Soc., vol. 80 (1959), p. 1339.

Coleman et al., "Defect Formation in Graphene Nanosheets by Acid Treatment: An X-ray Absorption Spectroscopy and Density Functional Theory Study," Journal of Physics D: Applied Physics, vol. 41, Feb. 21, 2008, pp. 1-4.

U.S. Appl. No. 14/745,747, filed Jun. 22, 2015, SiNode Systems, Inc.

* cited by examiner

CARBON CONTAINING BINDERLESS ELECTRODE FORMATION

CROSS REFERENCE TO RELATED APPLICATION

This application claims priority to U.S. provisional application Ser. No. 62/032,505, filed on Aug. 1, 2014, which is incorporated herein by reference in its entirety.

TECHNICAL FIELD

This invention relates to the art of electrochemical cells, and more particularly, to a new and improved electrochemical cell, and electrode thereof. More particularly, an embodiment of the present invention is directed to an electrode for use in a lithium-ion electrochemical cell and method of fabrication thereof.

BACKGROUND OF THE INVENTION

Lithium (Li) ion electrochemical cells have high energy density and are commonly used in a variety of applications which include consumer electronics, wearable computing devices, military mobile equipment, satellite communication, spacecraft devices and electric vehicles. Lithium ion cells are particularly popular for use in large-scale energy applications such as low-emission electric vehicles, renewable power plants and stationary electric grids. Additionally, lithium ion cells are at the forefront of new generation wireless and portable communication applications. One or more lithium ion cells may be used to configure a battery that serves as the power source for these applications. The explosion in the number of higher energy demanding applications and the limitations of existing lithium ion technology are accelerating research for higher energy density, higher power density, higher-rate charge-discharge capability, and longer cycle life lithium ion cells. Today's commercialized lithium ion cells employ lithium intercalation materials for both the cathode and the anode.

Lithium ion cells are mainly composed of an anode, for example, graphite, a carbonate-based organic electrolyte, and a cathode comprising a cathode active material, for example, lithium cobalt oxide ($LiCoO_2$). Lithium ions are intercalated and deintercalated between the anode and the cathode through the electrolyte during discharge and charge. When the cell supplies power, or is discharging, lithium ions generally move from the negative electrode (anode) to the positive electrode (cathode). When the cell is storing energy for later use, or is charging, the opposite occurs. Lithium ions generally move from the positive electrode (the cathode) to the negative electrode (the anode) during charging. For the example, the theoretical capacities of a graphite anode and a $LiCoO_2$ cathode are 372 mAh/g and less than 160 mAh/g, respectively. These theoretical charge capacities, however, are too low for the recent surge in higher energy demanding applications.

Since it was first demonstrated that lithium metal can electrochemically alloy with other metals at room temperature, lithium alloying reactions with metallic or semi-metallic elements and various compounds have been investigated during the past few decades. Of the various lithium alloying elements studied for use in lithium ion cells, silicon (Si) has been considered one of the most attractive anode materials, because of its high gravimetric and volumetric capacity, and because of its abundance, cost effectiveness, and environmentally benign properties.

Prior art electrochemical cell electrodes are generally formed by mixing active electrode materials along with a solvent and binder material. The addition of the binder material, typically a polymeric binder, is added to hold the active electrode materials together. The binder acts like a glue that keeps the active electrode materials together and causes the materials to adhere to the current collector during electrochemical cycling. Furthermore, the binder enables the formation of the electrode shape during electrode manufacturing. As much as 15 weight percent binder may be used in a typical electrode fabrication process. The addition of this binder or binders provides an electrically inactive material that generally does not enhance, and in some cases may degrade the electrical performance of a resultant electrode within an electrochemical cell.

For example, polyvinylidene fluoride (PVDF) has conventionally been used as a prior art binder that is incorporated within a mixture of active electrode materials. This specific prior art binder was selected due to its resistance to volumetric swelling when exposed to electrolytic solutions typically found in a number of commercially available lithium ion batteries. However, this binder provides poor adhesion between active electrode materials and between the active electrode material and current collector. Thus, a large amount of binder is generally required for practical use. As a result, the capacity and energy density of the lithium ion secondary battery that utilize such binders typically decreases. In addition, because N-methylolpyrrolidone ("NMP") is generally an expensive organic solvent, manufacturing an electrode and/or an electrochemical cell may become cost prohibitive. Furthermore, special safety and environmental precautions are generally needed to be taken when working with NMP, particularly when preparing the electrode slurry mixture, and when attaching the final electrode to a current collector.

Water-dispersible styrene-butadiene rubbers (SBR) combined with a thickening agent of carboxymethyl cellulose (CMC) have been proposed to solve the problems as noted above. Such a combination of styrene-butadiene rubbers (SBR) and carboxymethyl cellulose (CMC) has been used because: (1) the SBR type dispersing element is inexpensive, (2) it is water dispersible, (3) it has working environment conservational advantages, and (4) adhesion between active electrode materials and adhesion between the active electrode materials and current collectors is favorable.

SUMMARY

One embodiment of the invention provides an electrode, comprising:
  a) a first active electrode material comprising carbon;
  b) a second active electrode material combined with the first active electrode material; and
  c) a non-active material portion comprising carbon.

Another embodiment of the invention provides a method of fabricating an electrode, comprising:
  providing a substrate having a surface;
  providing an electrode slurry comprising a first active electrode material comprising carbon, a second active electrode material, a dispersant and at least one solvent; and
  applying the electrode slurry to the substrate surface.

Another embodiment of the invention provides an electrochemical cell, comprising:
  a) a negative electrode comprising:
    i) a first active electrode material comprising carbon;
    ii) a second active electrode material combined with the first active electrode material; and iii) a non-active material portion comprising carbon;
b) a positive electrode comprising a positive active electrode material having a lithium constituent; and
c) an ionically conductive electrolyte solution.

DETAILED DESCRIPTION

The present inventors realized that even the combined SBR and CMC binder has a generally low mechanical stability and a low swelling resistance to electrolytic solvents. Furthermore, this binder typically decreases charge-discharge cycle characteristics, particularly in the case of a lithium ion secondary battery for use at high temperatures.

The addition of a passive binder material(s) also may reduce both volumetric and gravimetric energy densities of the electrode, which, in turn, may adversely affect the performance of the finished electrochemical cell. This is due to the passive binder material occupying space within the electrode that otherwise could be occupied by additional active electrode material.

Finally, during subsequent processing, the active electrode material is often subjected to an elevated temperature which typically volatilizes the binder material that may leave behind undesirable residue or create undesirable porosity within the electrode structure.

In summary, the present inventors realized that addition of a binder material within the electrode active material mixture generally produces a less efficient electrode ultimately resulting in an electrochemical cell having a reduced energy density. Moreover, the addition of a binder material within the electrode active material mixture may increase the possibility of increasing porosity within the electrode structure that could compromise mechanical robustness and/or increase the fragility of the electrode. Accordingly, there is a need for the removal of the binder material from lithium ion electrodes that resolves these issues and also increases electrode electrical conductivity.

In general the embodiments of the present invention relate to a structure and method of formation of a binderless electrode that is incorporatable within an electrochemical cell. More specifically, the embodiments of the present invention relate to the structure and method of formation thereof of an anode comprises silicon and graphene in which an organic binder is not incorporated within the active electrode material mixture that comprises the resultant electrode. The anode is designed to be integrated within a lithium-ion electrochemical cell. Thus, the finished electrode contains no binder residue as, during electrode formation, binder is not added to the active electrode material mixture. In contrast, prior art electrodes that are formed by using a binder in the electrode slurry may typically contain some binder residue.

The electrode is initially formed from the preparation of active electrode materials. A first active electrode material is dispersed in an appropriate solvent or solvent solution to form a first active electrode material suspension. The first active electrode material suspension preferably comprises a carbon material that is dispersed in a solvent or solvent solution. In a preferred embodiment, graphenic particles, such as graphene and/or graphene oxide are added to a solvent comprising a polar aprotic solvent, water, ethanol or combinations thereof. Alternatively, other carbon materials such as graphite, carbon nano-platelets, carbon nanotubes, carbon nano-ribbons, the like, and combinations thereof may be added in addition or in substitution to the graphenic particles. Additional solvents include, but are not limited to, isopropyl alcohol, ethyl acetate, ethylene glycol, N-methylolpyrrolidone, and combinations thereof. Dispersion of the active electrode material suspension may be aided by ultrasonication, agitation and/or shearing.

In an embodiment, a second active electrode material suspension is created that comprises a mixture of silicon, silicon oxide or combinations thereof dispersed in an appropriate solvent or solvent solution. Preferred solvents include, but are not limited to, water, isopropyl alcohol, ethanol, ethyl acetate, ethylene glycol, N-methylolpyrrolidone, and combinations thereof. Alternatively, the silicon and/or silicon oxide may be directly combined with the first active electrode material suspension such as a graphenic material suspension. A surfactant, such as Triton X100 may also be added to either or both of the active electrode material suspensions to aid in the dispersion of the active materials.

The active electrode materials are combined to produce an electrode slurry that is applied to a surface of a substrate composed of variety of materials. Examples of substrate materials include, but are not limited to, metals, polymers, ceramics and glasses. In a preferred embodiment, the substrate is a current collector designed for incorporation within an electrochemical cell.

In a preferred embodiment, an adhesive agent is first applied to the surface of the substrate as a primer layer prior to the application of the electrode slurry to promote the adhesion of the electrode slurry thereto. After the electrode slurry has been applied to the substrate surface, it is dried to volatize the solvent(s) from the slurry and ensures adhesion of the electrode layer(s) to the substrate surface. After the electrode layer(s) have been dried, the layers are then heat treated by subjecting the electrode layers to a second heat source. The heat treatment process preferably increases the electrical conductivity of the electrode layer(s). Heat may be applied to the electrode slurry by the utilization of conventional drying, UV curing, infrared light (IR). In addition, other drying techniques such as vacuum drying, freeze drying, osmosis, and combinations thereof may also be used.

Once the electrode has been fabricated, it is then incorporated within an electrochemical cell comprising a counter electrode or cathode and an electrolyte solution.

The embodiments of the invention provide an electrode, and method of fabrication thereof, that is incorporated within an electrochemical cell. In a preferred embodiment, the electrode of the embodiments of the present invention is an anode or negative electrode that is incorporatable within a secondary lithium-ion electrochemical cell. As defined herein a "secondary" electrochemical cell is an electrochemical cell or battery that is rechargeable.

The electrode of the embodiment of the present invention is preferably composed of a graphenic based matrix material. More specifically, the electrode may comprise a plurality of graphene sheets that are preferably arranged in a vertical stack. The vertical stack structure preferably has a continuous network of graphitic regions comprising both crystalline and non-crystalline "disordered" portions of graphene. Furthermore, the continuous network of graphitic regions is integrated with a composite comprising: (a) disordered portions of the vertical stack of graphene or graphene oxide sheets; and (b) an anode active constituent, such as silicon (Si), silicon oxide, tin (Sn), tin oxide, antimony (Sb), aluminum (Al), silver (Ag), germanium (Ge), gallium (Ga), magnesium (Mg), zinc (Zn), lead (Pb), bismuth (Bi), carbon (C), titanium oxide, lithium titanium oxide, their alloys, intermetallics, and mixtures thereof, preferably in a nano-particle form.

In addition, at least some of the graphene sheets within the vertical stack may comprise defect pores formed by in-plane carbon vacancies. In a preferred embodiment, at least a plurality of the defect pores is randomly distributed throughout the graphene sheet structure. Further details about the preferred anode active materials and structures thereof, is disclosed in U.S. Pat. Nos. 8,551,650 and 8,778,538, both to Kung et al., and all of which are incorporated herein by reference. Other suitable active negative electrode material compositions may include, but are not limited to, graphite, synthetic graphite, coke, fullerenes, other graphitic carbons, niobium pentoxide, or silicon-based composites.

The form of the anode may vary, but typically, the anode is a thin sheet or foil of the material that is applied to a metallic anode current collector, i.e., preferably comprising copper, to form an anode component. In the electrochemical cell of the embodiment of the present invention, the anode component may have an extended tab or lead of the same metal as the anode current collector, i.e., preferably copper, integrally formed therewith. Alternatively, the anode may be formed in some other geometry, such as a bobbin shape, cylinder or pellet to allow an alternate low surface cell design.

Figure 1:
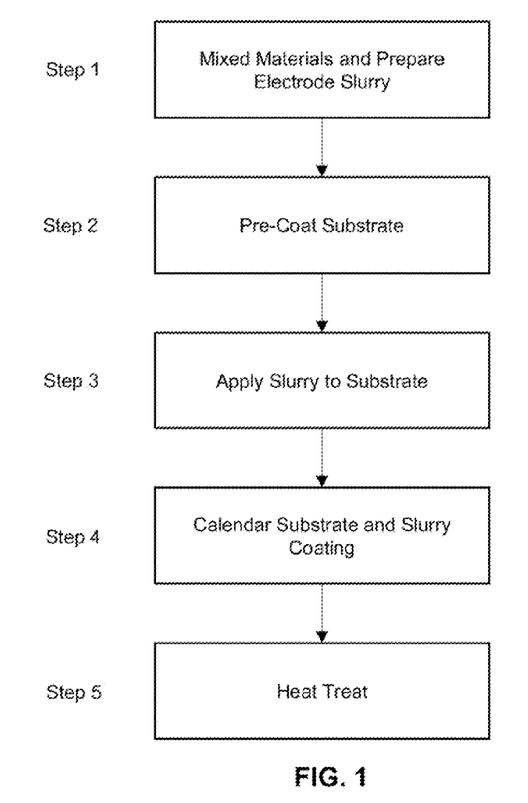
FIG. 1 is a process flow chart that illustrates an embodiment of the electrode fabrication process of the embodiment of the present invention.

In a preferred embodiment, the electrode of the embodiment of the present invention is constructed from an electrode slurry composed of various active electrode materials and constituents that is applied to a surface of an electrode current collector. FIG. 1 provides an overview of the present electrode fabrication process. As will be discussed in more detail, in step 1, appropriate proportions of the active electrode materials and other constituents are first mixed together to form an active electrode material slurry mixture. In optional step 2, an optional primer or pre-coat layer comprising an adhesive agent is preferably applied to the surface of a substrate, such as a current collector, to promote adhesion of the electrode slurry thereto. Steps 1 and 2 may be carried out in any order. In step 3, the electrode slurry is then applied to the pre-coat material on the surface of the substrate. In optional step 4, the applied slurry is calendared. In step 5, the applied electrode slurry is dried and heat treated to ensure a strong adhesive bond to the surface of the current collector.

The electrode slurry of the embodiment of the present invention is specifically formulated without the addition of an organic binder such as polyvinylidene fluoride (PVDF). The addition of such organic binders generally decreases adhesion of the electrode slurry to the surface of the current collector. As a result of such decreased adhesion, the active electrode material may undesirably become detached from the surface of the current collector, particularly when subjected over long periods of time, e.g., months or years, within an electrolyte solution. Detachment of the active electrode material is particularly problematic when applying the active electrode material to a copper surface such as a copper electrode current collector. In addition, the organic binder composed within prior art electrode formulations may make the electrode material susceptible to delamination from the metallic surface of the current collector and/or adjacent electrode layers. The present inventors have therefore discovered that by formulating the electrode without the use of an organic binder and, in some cases applying a pre-coat layer to the surface of the current collector, significantly improves adhesion of the electrode to the current collector surface, thereby minimizing the likelihood of electrode detachment.

In a preferred embodiment, the active electrode slurry comprises a mixture of at least a first active electrode material, composed of a graphenic material, and a second active electrode material, composed of silicon (Si), silicon oxide, tin (Sn), tin oxide, antimony (Sb), aluminum (Al), silver (Ag), germanium (Ge), gallium (Ga), magnesium (Mg), zinc (Zn), lead (Pb), bismuth (Bi), carbon (C), titanium oxide, lithium titanium oxide, their alloys, intermetallics or combinations thereof. A dispersant may be added to the mixture of active electrode materials to ensure a homogenous mixture thereof. Examples of dispersants include, but are not limited to, glycol ethers (such as poly(ethylene oxide), block copolymers derived from ethylene oxide and propylene oxide (such as those sold under the trade name Pluronic® by BASF), acetylenic diols (such as 2,5,8,11-tetramethyl-6-dodecyn-5,8-diol ethoxylate and others sold by Air Products under the trade names Surfynol® and Dynol®), salts of carboxylic acids (including alkali metal and ammonium salts), and polysiloxanes. Additional examples of dispersants may include sodium dodecanoate, alkanolamide, lanolin, polyvinylpyrrolidone, sodium alkyl sulfate, sodium alkyl sulfonate, lecithin, polyacrylate, sodium silicate, and polyethoxy.

In a preferred embodiment, the first active electrode material preferably comprises graphene and/or graphene oxide having a particle size distribution that ranges from about 0.5 µm to about 30 µm. In a preferred embodiment, the graphene or graphene oxide may comprise a first particle size distribution ranging from about 0.5 µm to about 5 µm, a second particle size distribution ranging from 5 to 25 µm, such as about 10 µm to about 20 µm, or combinations thereof. In a preferred embodiment, the graphene and/or graphene oxide particles are of a sheet or rectangular form such as those discussed in the '650 and '538 patents to Kung et al. Alternatively, other carbon materials such as graphite, carbon nano-platelets, carbon nanotubes, carbon nano-ribbons, and combinations thereof may be added in addition or in substitution to the graphenic particles.

In a preferred embodiment the second active electrode material preferably comprises silicon, Si having a particle size that ranges from about 5 nm to about 100 nm. In a more preferred embodiment, the silicon may have a first particle size distribution ranging from about 5 nm to about 10 nm, a second particle size distribution ranging from about 50 nm to about 100 nm, or combinations thereof. In addition, at least a portion of the silicon that comprises the electrode slurry formulation may be of silicon oxide having the chemical formula of $SiO_x$ where x ranges from 1 to 2 (e.g., the silicon oxide includes $SiO$, $SiO_2$ and compositions therebetween). The silicon oxide may be created by the formation of an oxide layer on the surface of the silicon particles. In this embodiment, a hydrophilic oxide layer may be formed on the surface of the silicon particles by exposing the silicon particles to an ambient air atmosphere from about one to about 24 hours. Alternatively, the silicon oxide may be formed through a chemical reaction or heat treatment of the silicon as commonly known in the art.

Furthermore, at least a portion of the graphene that comprises the electrode slurry formulation may be in the form of graphene oxide (GO). The graphene oxide may be prepared by any method commonly known in the art. Examples of such graphene oxide (GO) preparation methods may include, but are not limited to, the Hummers' method which utilizes a mixture of sulfuric acid $H_2SO_4$, sodium nitrate $NaNO_3$, and potassium permanganate $KMnO_4$, the Tang-Lau method, and the graphene oxide preparation method disclosed in the '650 and '538 patents to Kung et al., as previously disclosed.

The electrode slurry may be formulated by combining separate active electrode material suspensions. In a preferred embodiment, a first active electrode material suspension may be formulated by combining proportional amounts of graphene, graphene oxide, or combinations thereof with a first solvent or solvent solution. A second active electrode material suspension may be formulated by combining proportional amounts of silicon, silicon oxide or combinations thereof with a second solvent or solvent solution. Desired amounts of these first and second active material suspensions are thus combined to formulate the active electrode slurry. Alternatively, the second active electrode material, i.e., silicon and/or silicon oxide, may be directly combined with the first active electrode material suspension. For example, the first and second active materials may be premixed and/or provided at the same time into the first solvent to form the active electrode material suspension. Likewise, the first active electrode material, i.e., graphene or graphene oxide, may be directly combined with the second active electrode material suspension. In addition, the electrode slurry may optionally comprise one or more additional additives, such as dispersant (including surfactants, emulsifiers, and wetting aids), a thickening agent (including clays), defoamers and antifoamers, biocides, additional fillers, flow enhancers, stabilizers, cross-linking and curing agents. Examples of thickening agents include glycol ethers (such as poly(ethylene oxide), block copolymers derived from ethylene oxide and propylene oxide (such as those sold under the trade name Pluronic® by BASF), long-chain carboxylate salts (such aluminum, calcium, zinc, salts of stearates, oleats, palmitates), aluminosilicates (such as those sold under the Minex® name by Unimin Specialty Minerals and Aerosil® 9200 by Evonik Degussa), fumed silica, natural and synthetic zeolites.

The respective first and second solvents or solvent solution mixtures are preferably non-reactive with the active electrode materials. Preferred first and second solvents may include, but are not limited to, water, ethanol, isopropyl alcohol, ethylene glycol, ethyl acetate, polar protic solvents, polar aprotic solvents, N-methyl-2-pyrrolidone and combinations thereof. Dispersion of the active electrode material suspension or electrode slurry mixture may be aided by ultrasonication, agitation and/or shearing action. A dispersant, such as a non-ionic dispersant may also be added to the active electrode slurry or active electrode material suspensions to aid in the dispersion of the active electrode materials. Examples of dispersants include, but are not limited to, polyvinylpyrrolidone, nitrocellulose and Triton® X-100 a dispersant having the chemical formula, $(C_2H_4O)nC_{14}H_{22}O$ produced by DOW Chemical company of Midland Mich. In a preferred embodiment, from about 0.01 to about 1.0 weight percent of the dispersant may be added to the active electrode mixture. In a more preferred embodiment, from about 0.01 weight percent to about 0.5 weight percent of the dispersant may be added to the active electrode material mixture, comprised of either or both of the first and second active electrode materials.

In a preferred embodiment, the active electrode material slurry of the embodiment of the present invention comprises from about 0.5 to about 5 weight percent of the first active electrode material, from about 0.5 to about 5 weight percent of the second active electrode material, from about 0.01 to about 0.50 weight percent dispersant, and the remainder comprising the solvent or solvent solution. Each of the active electrode constituents may be added separately, or alternatively, as active electrode suspensions comprising at least portions of the active electrode materials and respective solvents that are combined to create the active electrode slurry of the embodiment of the present invention.

In a preferred embodiment, a first active electrode material suspension may also be created in which a carbon material is dispersed in an appropriate first solvent or solvent solution mixture. In an exemplary embodiment, graphenic particles, such as graphene, graphene oxide, and combinations thereof are added to the first solvent or solvent solution mixture. In a preferred embodiment, at least 0.4 weight percent of the carbon material, preferably graphene oxide, is added to the first solvent or solvent solution to create the first active electrode material suspension. In a more preferred embodiment, from about 2 weight percent to about 10 weight percent of the carbon material, preferably graphene oxide is added to isopropyl alcohol, ethyl acetate, N-methyl-2-pyrrolidone and combinations thereof.

In addition, a second active electrode material suspension may be prepared comprising about 1 weight percent of either of the silicon or silicon oxide particles dispersed in a second solvent or solvent solution, such as isopropyl alcohol. In addition, the second active electrode material suspension may comprise tin (Sn), tin oxide, antimony (Sb), aluminum (Al), silver (Ag), germanium (Ge), gallium (Ga), magnesium (Mg), zinc (Zn), lead (Pb), bismuth (Bi), carbon (C), titanium oxide, lithium titanium oxide, their alloys, intermetallics, and mixtures thereof. The suspension may be further dispersed through manual or automated agitation and/or sonication for about 30 seconds to about 30 minutes.

Once the first and second active electrode suspensions have been prepared, they are then combined to form the electrode slurry having a uniform consistency. In an embodiment, the first active electrode suspension comprising graphene and/or graphene oxide is added to the second active electrode suspension comprising silicon or silicon oxide particles.

In a preferred embodiment, the first and second active electrode materials are combined having a ratio of silicon to carbon from 1 part silicon to between 5 and 30 parts carbon. For example, the ratio may comprise from about 1 part silicon to about 20 parts carbon. Alternatively, the ratio may comprise from about 10 parts silicon to about 1 part carbon. In another embodiment, the active slurry may comprise from about 0.5 weight percent to about 90 weight percent silicon, about 0.5 weight percent to about 50 weight percent graphene, about 0.1 to about 5 weight percent dispersant, and the remainder comprising the first or second solvents. In a preferred embodiment, the first active electrode material suspension may comprise from about 0.5 to about 5.0 weight percent weight graphene and/or graphene oxide, the remainder comprising a solvent or solvent solution comprising at least one of isopropyl alcohol, ethyl acetate, NMP, and combinations thereof. The second active electrode material suspension may comprise from about 10 to about 50 weight percent silicon and/or silicon oxide, the remainder comprising a solvent or solvent solution comprising isopropyl alcohol, ethyl acetate, NMP, and combinations thereof. In another preferred embodiment, the active electrode slurry may comprise from about 85 to about 95 weight percent of the first active electrode material suspension, about 1 to about 10 weight percent of the second active electrode material suspension, the remainder comprising a dispersant.

In an alternate embodiment, a desired amount of the carbon particles comprising the first active electrode suspension may be added to the second active electrode suspension comprising silicon nano-particles. The mixture of active electrode materials is sonicated for between about 1-3 hours and then filtered under vacuum. The vacuum filtration process is preferred because it promotes a preferred structural alignment of the silicon-graphene structure. The vacuum filtration process preferably results in an electrode material comprising a continuous network of graphitic regions comprising crystalline portions of the vertical stack of graphene sheets.

In an embodiment, the electrode slurry suspension may be further dispersed through manual or automated agitation. Such agitation may include physical shaking or rocking of the suspension. In addition, the electrode slurry suspension may be subjected to ultrasonication for about 30 seconds to about 30 minutes to further disperse the silicon and carbon particles and help to create a homogeneous electrode suspension mixture. Table I, shown below, provides respective weight percents and particle size range of the constituents that comprise exemplary active electrode slurry formulations.

TABLE I

| Sample Number | Graphene Oxide (wt. %) | Graphene Oxide Particle Size (μm) | Silicon (wt. %) | Silicon Particle Size | Dispersant (wt. %) | Solvent (wt. %) |
| --- | --- | --- | --- | --- | --- | --- |
| 1 | 0.8-2.5 | 10-20 | 0.4-2.0 | 50-800 nm | 0.05-0.20 | 95-99 |
| 2 | 0.8-2.5 | 0.5-4 | 0.4-2.0 | 50-800 nm | 0.05-0.20 | 95-99 |
| 3 | 0.8-2.5 | 10-20 | 0.4-2.0 | 6-200 nm | 0.05-0.20 | 95-99 |

The electrode slurry should be prepared such that it is able to adequately flow and adhere onto the surface of the substrate. In a preferred embodiment, the electrode slurry may have a viscosity ranging from about 0.1 Pa·S to about 1,000 Pa·S at a shear rate of between about 0.1 to 1,000 $s^{-1}$.

After the electrode slurry has been formulated, the slurry is then applied to the surface of a substrate. In an embodiment, the electrode slurry may be applied to the surface of a substrate comprising a metal, a polymer, a ceramic, and combinations thereof. Non-limiting examples of substrate materials may include, but are not limited to, metals such as copper, aluminum, nickel, and their alloys, polymers such as polyethylene, polyimide, and polyether ether ketone (PEEK), as well as alumina and various glasses. In a preferred embodiment, the electrode slurry is applied to the surface of a current collector such as those composed of copper, nickel, aluminum, and combinations thereof.

In a preferred embodiment, the electrode slurry may be applied to a desired thickness ranging from a few nanometers to a few micrometers using a variety of non-limiting application techniques. These application techniques may include, but are not limited to, the use of Meyer rod coating, the use of a doctor blade or knife, spray coating, dip coating, spin coating or brush application. In addition, the electrode slurry layer may be applied to a substrate surface through the use of thick-film or thin-film processing techniques.

Furthermore, in an embodiment, the surface of the substrate may be modified prior to the application of the electrode slurry to improve adhesion to the substrate surface. Examples of such substrate surface modifications include but are not limited to, surface etching or surface roughening through the use corona treatment, acid etching, sand blasting or bead blasting.

In addition, a primer layer comprising the adhesion agent having a primer layer thickness ranging from about 0.1 nm to about 20 μm may be applied to the surface of the substrate prior to the application of the electrode slurry to improve adhesion to the substrate surface. In an embodiment, at least one layer of the primer layer comprising the adhesion agent is applied directly to the surface of the substrate prior to the application of the electrode slurry. Examples of adhesion agents include, but are not limited to, titanium chelates and other titanium compounds such as titanium phosphate complexes (including butyl titanium phosphate), titanate esters, diisopropoxy titanium bis(ethyl-3-oxobutanoate, isopropoxy titanium acetylacetonate, and others sold by Johnson-Matthey Catalysts under the trade name Vertec, polyvinylpyrrolidone, nitrocellulose having the chemical formula of either $C_6H_9(NO_2)O_5$, $C_6H_8(NO_2)_2O_5$ or $C_6H_7(NO_2)_3O_5$, and combinations thereof.

Alternatively, the primer layer may comprise one or combination thereof of graphene, graphene oxide, silicon, and silicon oxide mixed with a primer coat solvent or solvent solution. The primer coat solvent may comprise water, ethanol, isopropyl alcohol, ethylene glycol, ethyl acetate, polar protic solvents, polar aprotic solvents, N-methyl-2-pyrrolidone and combinations thereof. In yet another embodiment, the primer coat may comprise a mixture of the adhesive agent with at least one of the second active electrode materials. In either case, once the primer is applied to the substrate surface, it is preferably allowed to dry before the electrode slurry is applied to the surface of the primer layer.

After the electrode slurry has been applied to the surface of the primer and substrate, it may then be calendered to ensure a smooth, homogenous layer of electrode material on the surface of the current collector. In a preferred embodiment, rollers may be applied to the applied slurry layer on the substrate surface to apply a force thereto. The action and applied pressure of the rollers to the layer surface helps fill in surface gaps and helps to minimize surface porosity in the finished electrode.

After the calendaring process, the electrode slurry is subjected to a drying process that preferably minimizes cracking of the applied electrode slurry, nor does the drying process encourage de-lamination or de-adhesion of the slurry from the substrate surface. In an embodiment, the electrode slurry layer may be dried using convection air drying, a UV light source and/or an infrared light source. Additionally the electrode slurry may be dried through the use of freeze drying, vacuum drying, or through osmosis. In addition, the slurry may be dried through application of a heat source that is applied directly to the exposed surface of the electrode slurry coating or alternatively, the electrode slurry may also be dried through application of a heat source to the underlying substrate, or both. Furthermore, the electrode slurry may be dried in a variety of non-limiting atmosphere conditions having a variety of atmospheric pressures. For example, a gas such as nitrogen may be used to control the drying process. In a preferred embodiment, the electrode ink is dried to a thickness ranging from about 10 to 50 μm. The thickness of the dried electrode layer(s) is preferably targeted to achieve a desired electrical capacitance, electrode density and charge density of the resulting electrode.

In an embodiment, the dried layer(s) of electrode slurry is then subjected to a heat treatment process to reduce at least a portion of the graphene oxide to graphene. In a preferred embodiment, the dried electrode layer(s) is subjected to an elevated temperature ranging from between 250° C. to about 1,200° C. for about 1 minute to as long as about 3 hours. In a more preferred embodiment, the applied electrode slurry is heat treated at a temperature ranging from about 600° C. to about 800° C. for about 1 hour. In addition, the applied electrode slurry may be heat treated in an inert atmosphere, such as in a nitrogen or argon environment. In a preferred embodiment the electrode layer or layers is heat treated in an argon atmosphere.

The heat treatment volatizes the solvent and dispersant content from the slurry composition and creates a monolithic electrode structure. The heat treated electrode thus comprises a first active electrode material portion, a second active electrode material portion and a third non-active material portion. The first active electrode material portion comprises graphene, graphene oxide and combinations thereof, the second active electrode material comprises silicon (Si), silicon oxide, tin (Sn), tin oxide, antimony (Sb), aluminum (Al), silver (Ag), germanium (Ge), gallium (Ga), magnesium (Mg), zinc (Zn), lead (Pb), bismuth (Bi), carbon (C), titanium oxide, lithium titanium oxide, their alloys, intermetallics, and mixtures thereof. The third non-active material portion comprises a carbon material, at least a portion thereof may comprise amorphous carbon. In a preferred embodiment, after the heat treatment process the first active electrode material portion comprises from about 28 to about 70 weight percent, the second active electrode portion comprises from about 30 weight percent to about 70 weight percent, and the third non-active material portion comprises from about 0.01 weight percent to about 5 weight percent of the electrode.

The heat treatment process is preferred because it improves electrical conductivity and, thus, improve the electrical performance of the resultant electrode and electrochemical cell. The inventors have discovered that the application of the heat treatment process improves electrical conductivity of the electrode from about 0.005 S/cm to about 200 S/cm. Thermal treatment of the dried electrode ink improves the electrical conductivity by as much as 5 orders of magnitude (~$10^5$). Generally, without the thermal treatment process, the electrodes contain a relatively large amount of oxygen groups that degrades the electrical conductivity of the electrode. Table II provides selected properties of an electrode fabricated by the active electrode materials and fabrication process of the embodiment of the present invention. In particular, Table II illustrates theoretical values of porosities and volumetric capacities with increasing amounts of carbon in comparison to measured values of an electrode fabricated with the fabrication process of the embodiment of the present invention. As illustrated below, increasing the weight percent of carbon within a silicon and carbon comprising electrode increases the percent porosity and decreases volumetric capacity. This is attributed to the increased volume of carbon within the electrode structure that occupies space that could have been occupied by electrode active materials. In addition, it is noted that an electrode comprising a 70:30 weight percent ratio of Si to carbon that was fabricated with the method of the embodiment of the present invention, was measured to have a volumetric capacity of about 2700 mAh/cc. This data point illustrates the increased volumetric capacity that results from constructing an electrode with an increased weight percent of active electrode material.

TABLE II

| Active Anode Material Si:C Ratio | Substrate thickness (μm) | Electrode Thickness (μm) | Density (g/cc) | Porosity (percent) | Volumetric capacity (mAh/cc) |
| --- | --- | --- | --- | --- | --- |
| 70:30 (theoretical) | 10 | 1 | 1.8 | 15 | ~3600 |
| 70:30 (measured) | 10 | 5 | 1.5 | 30 | ~2700 |
| 50:50 (theoretical) | 10 | 5 | 1.5 | 30 | ~2400 |
| 30:70 (theoretical) | 10 | 20 | 1.0 | 60 | ~1500 |
| 10:90 (theoretical) | 10 | 50 | 0.4 | 80 | ~800 |
| Graphite | 10 | 100 | 1.8 | 30 | ~500 |

After the electrode has been heat treated, it is incorporated into an electrochemical cell (e.g., secondary battery). The electrode may comprise a current collector substrate and an adhered electrode material. In an alternative embodiment, if the substrate is a temporary substrate rather than a current collector substrate, then, after heat treatment, the electrode material may be removed from the substrate to form a free standing electrode comprising only the electrode material. The substrate may be removed through dissolution. This helps to preferably align the silicon and the carbon (graphene) particles in a free standing orientation. The term 'free standing' is defined herein as sufficiently isolated from its environment, in this case, sufficiently absent the substrate. In a preferred embodiment, removal of the electrode layer from the substrate preferably results in an electrode material comprising a continuous network of graphitic regions comprising crystalline portions of the vertical stack of graphene sheets. In all of these embodiments, the electrode does not contain a binder residue.

The formulated electrode is preferably an anode or negative electrode that is utilized within a secondary lithium-ion electrochemical cell. The electrochemical cell of the embodiment of the present invention further comprises a cathode composed of an electrically conductive material that serves as the other, positive electrode of the cell. The cathode is preferably made of solid materials and the electrochemical reaction at the cathode involves conversion of lithium ions that migrate back and forth between the anode, i.e., a first electrode, and the cathode, i.e., a second electrode, into atomic or molecular forms. During discharge of the cell, lithium ions flow from the anode or negative electrode to the cathode or positive electrode. To recharge such secondary cells, lithium ions from the cathode or positive electrode are intercalated into the anode by applying an externally generated electrical potential to the cell. The applied recharging potential serves to draw lithium ions from the cathode material, through the electrolyte and into the anode.

The solid cathode may comprise a cathode active material of a metal oxide, a lithiated metal oxide, a metal fluoride, a lithiated metal fluoride or combinations thereof as disclosed in U.S. patent application Ser. No. 14/745,747 to Hayner et al., which is assigned to the assignee of the present application and incorporated herein by reference. In a preferred embodiment, the cathode active material comprises $LiNi_x Co_y Al_z O_2$, where x, y, and z are greater than 0 and wherein x+y+z=1. Other preferred cathode active materials may include, but are not limited to lithium cobalt oxide (LiCoO$_2$), lithium iron phosphate (LiFePO$_4$) and lithium manganese oxide (LiMn$_2$O$_4$). Additional preferred cathode active materials may also include, but are not limited to, LiNi$_x$Mn$_y$Co$_z$O$_2$, where 0.3≤x≤1.0, 0≤y≤0.45, and 0≤z≤0.4 with x+y+z=1. Furthermore, the cathode active material may comprise Li$_{1+x}$Ni$_\alpha$Mn$_\beta$Co$_\gamma$O$_2$, where x ranges from about 0.05 to about 0.25, α ranges from about 0.1 to about 0.4, β ranges from about 0.4 to about 0.65, and γ ranges from about 0.05 to about 0.3.

In a larger scope, the cathode active material may comprise sulfur (S), lithium sulfide (Li$_2$S), a metal fluoride, a lithium metal fluoride, a lithium metal phosphate, and a lithium metal silicate where the metal may comprise a transition metal from the Periodic Table of Elements, such as iron (Fe), manganese (Mn), cobalt (Co), nickel (Ni), copper (Cu), vanadium (V), chromium (Cr), non-transition metals such as bismuth (Bi), and combinations thereof. Specific examples of cathode active materials may include MF$_x$ where 0≤x≤3, Li$_x$MF$_x$ where 0≤x≤3, LiMPO$_4$, Li$_2$MSiO$_4$ composite layered-spinel structures such as LiMn$_2$O$_4$-LiMO where M is a transition metal from the Periodic Table of Elements, such as iron (Fe), manganese (Mn), cobalt (Co), nickel (Ni), copper (Cu), vanadium (V), chromium (Cr), a non-transition metal such as bismuth (Bi), and combinations thereof. Lithium rich positive active electrode materials of particular interest can also be represented approximately by the formula Li$_{1+x}$Ni$_a$Mn$_b$Co$_c$A$_d$O$_{2-z}$F$_z$, where x ranges from about 0.01 to about 0.3, a ranges from about 0 to about 0.4, b ranges from about 0.2 to about 0.65, c ranges from 0 to about 0.46, d ranges from 0 to about 0.15 and Z ranges from 0 to about 0.2 with the proviso that both a and c are not zero, and where A is magnesium (Mg), strontium (Sr), barium (Ba), cadmium (Cd), zinc (Zn), aluminum (Al), gallium (Ga), boron (B), zirconium (Zr), titanium (Ti), calcium (Ca), selenium (Ce), yttrium (Y), niobium (Nb), chromium (Cr), iron (Fe), vanadium (V), lithium (Li) or combinations thereof. A person of ordinary skill in the art will recognize that additional ranges of parameter values within the explicit compositional ranges above contemplated and are within the present disclosure.

The cathode active material is preferably formed by the chemical addition, reaction, or otherwise intimate contact of various oxides, phosphates, sulfides and/or metal elements, preferably during thermal treatment, sol-gel formation, chemical vapor deposition, or hydrothermal synthesis in mixed states. The cathode active material thereby produced may contain metals, oxides, phosphates, and sulfides of Groups, IB, IIB, IIIB, IVB, VB, VIB, VIIB, VIII, and VIIA which includes the noble metals and/or other oxide and phosphate compounds. A preferred cathode active material is a reaction product of stoichiometric proportions of at least fully lithiated to non-lithiated, LiNi$_{0.8}$Co$_{0.15}$Al$_{0.05}$O$_2$.

The exemplary cell of the embodiment of the present invention further includes a separator to provide physical separation between the anode and cathode. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include non-woven glass, polypropylene, polyethylene, microporous material, glass fiber materials, ceramics, polytetrafluorethylene membrane commercially available under the designations ZITEX (Chemplast Inc.), polypropylene membrane, commercially available under the designation CELGARD (Celanese Plastic Company Inc.) and DEXIGLAS (C. H. Dexter, Div., Dexter Corp.).

The form of the separator typically is a sheet which is placed between the anode and cathode and in a manner preventing physical contact therebetween. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The exemplary electrochemical cell of the embodiment of the present invention preferably contains a nonaqueous, ionically conductive electrolyte operatively associated with the anode and the cathode. The electrolyte serves as a medium for migration of lithium ions between the anode and the cathode during electrochemical reactions of the cell, particularly during discharge and re-charge of the cell. The electrolyte is comprised of an inorganic salt dissolved in a nonaqueous solvent and more preferably an alkali metal salt dissolved in a mixture of low viscosity solvents including organic esters, ethers and dialkyl carbonates and high conductivity solvents including cyclic carbonates, cyclic esters and cyclic amides.

Additional low viscosity solvents useful with the embodiment of the present invention include dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate, methyl propyl carbonate, ethyl propyl carbonate, diethyl carbonate (DEC), dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-2-pyrrolidone (NMP), and mixtures thereof.

The preferred electrolyte of the embodiment of the present invention comprises an inorganic salt having the general formula YAF$_6$ wherein Y is an alkali metal similar to the alkali metal intercalated into the electrodes (e.g., lithium) and A is an element selected from the group consisting of phosphorous, arsenic and antimony. Examples of salts yielding AF$_6$ are: hexafluorophosphate (PF$_6$), hexafluoroarsenate (AsF$_6$) and hexafluoroantimonate (SbF$_6$). In addition, other salts may comprise lithium salts including LiPF$_6$, LiBF$_4$, LiAsF$_6$, LiSbF$_6$, LiClO$_4$, LiO$_2$, LiAlCl$_4$, LiGaCl$_4$, LiC(SO$_2$CF$_3$)$_3$, LiN(SO$_2$CF$_3$)$_2$, LiSCN, LiO$_3$SCF$_3$, LiC$_6$FSO$_3$, LiO$_2$CCF$_3$, LiSO$_6$F, LiB (C$_6$H$_5$)$_4$, LiCF$_3$SO$_3$, and mixtures thereof. More preferably, the electrolyte comprises at least one ion-forming alkali metal salt of hexafluoroarsenate or hexafluorophosphate dissolved in a suitable organic solvent wherein the ion-forming alkali metal is similar to the alkali metal comprising the anode. The alkali metal salt of the electrolyte preferably comprises either lithium hexafluoroarsenate or lithium hexafluorophosphate dissolved in a 50/50 solvent mixture (by volume) of EC/DMC. In the embodiment of the present invention, the preferred electrolyte is 0.8M to 1.5M LiAsF$_6$ or LiPF$_6$ dissolved in a 50:50 mixture, by volume, of dimethyl carbonate and ethylene carbonate.

The preferred form of the electrochemical cell is a lithium ion cell wherein the anode/cathode couple is inserted into a conductive metal casing. A preferred material for the casing is stainless steel, although titanium, mild steel, nickel, nickel-plated mild steel and aluminum are also suitable. The casing may comprise a metallic lid having a sufficient number of openings to accommodate a glass-to-metal seal/terminal pin feedthrough for the cathode and anode. An additional opening may be provided for electrolyte filling. The casing header comprises elements having compatibility with the other components of the electrochemical cell and is resistant to corrosion. The cell is thereafter filled with the electrolyte solution described hereinabove and hermetically sealed, such as by close-welding a stainless steel plug over the fill hole, but not limited thereto. The cell of the embodiment of the present invention can also be constructed in a case-positive design.

The glass-to-metal seal preferably comprises a corrosion resistant glass having from between about 0% to about 50% by weight silica such as CABAL 12, TA 23 or FUSITE MSG-12, FUSITE A-485, FUSITE 425 or FUSITE 435. The positive terminal pin feedthrough preferably comprises titanium although molybdenum and aluminum can also be used. The cell header comprises elements having compatibility with the other components of the electrochemical cell and is resistant to corrosion. The cell is thereafter filled with the electrolyte described hereinabove and hermetically sealed such as by close-welding a stainless steel ball over the fill hole, but not limited thereto. When the ionically conductive electrolyte becomes operatively associated with the anode and the cathode of the cell, an electrical potential difference is developed between terminals operatively connected to the anode and the cathode. During discharge, lithium ions migrate from the anode, i.e., the negative electrode to the cathode, i.e., the positive electrode. During recharge, lithium ions migrate in the opposite direction from the cathode to the anode. Migration of the lithium ions between the anode and cathode preferably occurs in atomic or molecular forms.

Sample lithium-ion cells were constructed with anodes fabricated using the formulation and fabrication method thereof of the embodiment of the present invention to test the electrical performance. A total of 12 lithium ion cells were constructed having an anode composed of one of the formulations delineated in table I and a counter electrode of lithium. Table III, shown below, delineates the anode formulation of each test cell that correlates with the anode formulations provided in Table I.

TABLE III

| Cell Number | Anode Formulation (from Table I) | Curve Number |
| --- | --- | --- |
| 1 | 1 | 10 |
| 2 | 1 | 12 |
| 3 | 1 | 14 |
| 4 | 2 | 16 |
| 5 | 2 | 18 |
| 6 | 2 | 20 |
| 7 | 1 | 22 |
| 8 | 1 | 24 |
| 9 | 1 | 26 |
| 10 | 2 | 28 |
| 11 | 2 | 30 |
| 12 | 2 | 32 |

Figure 2:
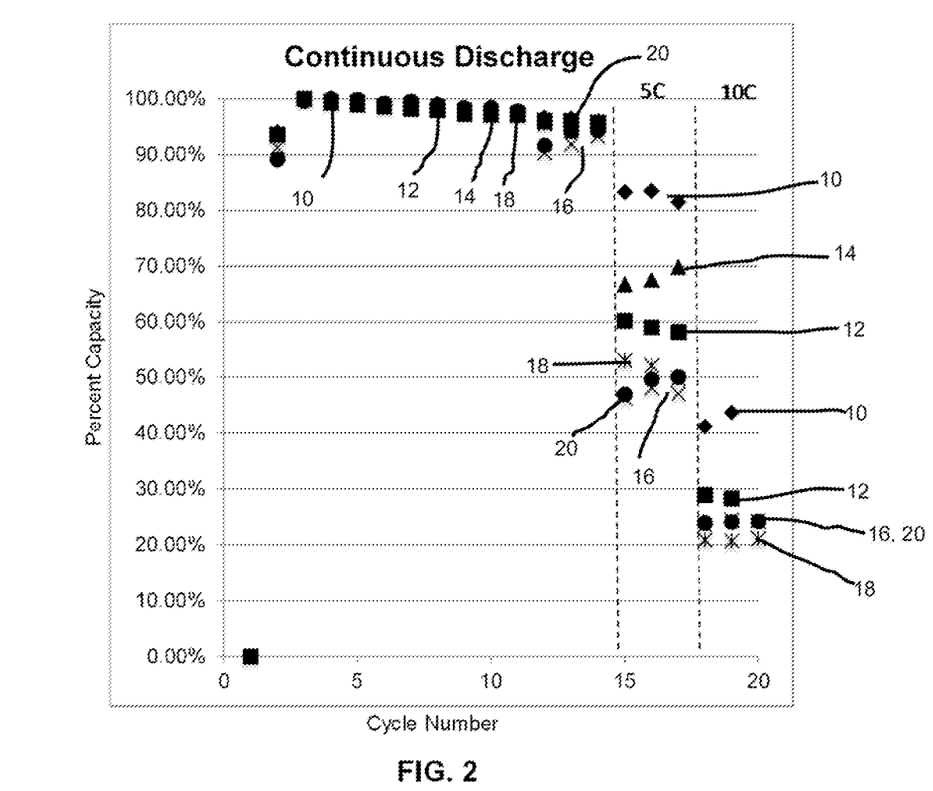
FIG. 2 shows continuous discharge test data of lithium ion cells comprising an anode composed of the active electrode material and fabrication process of the embodiment of the present invention.

These test cells were subjected to either continuous discharge or pulse discharge regimens to test the percent capacity of the respective cells. Specifically, test cells 1 to 6 were subjected to continuous discharge testing and test cells 7 to 12 were subjected to a pulse discharge test regimen. FIG. 2 illustrates the continuous discharge testing results of cell numbers 1 to 6 listed in Table III. During cycles 1-14, each of the cells were tested at a 1C discharge rating, from cycles 15 to 17 each of the cells were tested at a 5C discharge rate and from cycles 18 to 20 each of the cells were tested at a 10C discharge rate to a predetermined threshold voltage of about 20 mV. As illustrated in the graph, the test cell exhibited a fairly uniform discharge profile at the 1C discharge rate. By cycle 14, the test cells exhibited a capacity of between about 92 percent to about 96 percent with test cell 4 having the anode comprised of the relatively smaller graphene oxide flake size exhibiting the lower capacities of those cells tested. As illustrated in FIG. 2, increasing the discharge rate to 5C and 10C respectively, increased the differences in cell capacity with increasing cycle. For example, the lithium ion test cells 1, 2, and 3, having respective identification numbers 10, 12, and 14, each having an anode of composition 1, exhibited greater cell capacities during cycles 15, 16 and 17 at a 5C discharge rate. The same is true for test cells 1 and 2 (identification numbers 10 and 12) which also exhibited greater cell capacities at cycles 18, 19 and 20 at an increased discharge rate of 10C. This would seem to indicate that the test cells comprising the anode with the larger graphene oxide flake size, having a particle distribution between about 10-20 µm have a greater utilization of charge capacity particularly at higher rate discharge testing.

Figure 3:
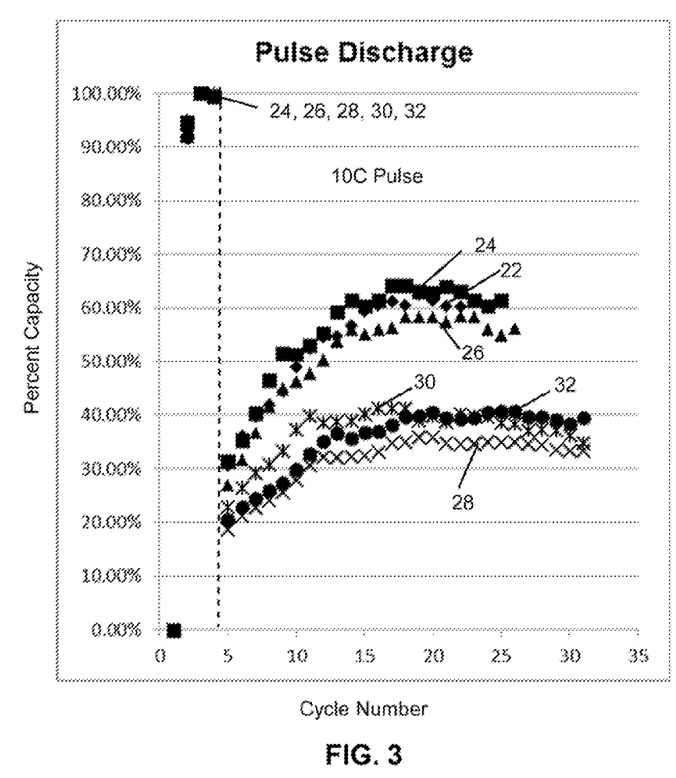
FIG. 3 is a graph that illustrates pulse discharge electrical performance test results of lithium ion electrochemical cells constructed with respective anodes composed of the active electrode materials and fabrication process of the embodiment of the present invention.

FIG. 3 illustrates percent cell capacity during cycles of pulse discharge testing. During the testing, cell numbers 7 to 12 were subjected to a continuous series of "on-off" discharge loads that comprised a 5 second pulse load followed by a 5 second rest period. This series of pulse load and rest periods were repeated until the cells exhibited a voltage of about 20 mV. All the test cells were tested at a discharge rate of 1C for the cycles 1-4 and were tested at a discharge rate of 10C at cycles 5 to 30. As FIG. 3 illustrates, all of the test cells exhibited a similar capacity during the first four discharge-rest cycles. However, as the discharge rate was increased to 10C, test cells 7, 8, and 9 (identification numbers 22, 24 and 26 respectively) having an anode composed of the larger flake graphene oxide size of about 10-20 µm exhibited greater percent capacity compared to test cell numbers 10, 11, and 12 (identification numbers 28, 30, 32) with anodes composed of graphene oxide flakes with a smaller flake size of about 0.5 to 4 µm. As illustrated the test cells comprising anodes having the larger size graphene oxide flakes exhibited a maximum cell discharge during the 10C discharge rate testing of between about 58 to 65 percent whereas the test cells comprising anodes having the smaller graphene oxide flake size exhibited a cell capacity of between about 35 to about 41 percent during the same test cycle number. This would also seem to indicate that the test cells comprising the anode composed of the graphene oxide having the larger flake size had a greater utilization of charge capacity particularly at higher rate discharge testing and in addition, also had an increased energy density as compared to the test cells that comprised the anode with the smaller size graphene oxide flakes.

In addition, the test cells comprising anodes with the electrode formulations of the embodiment of the present invention further illustrate that electrodes did not detach from their respective current collector as the test cells exhibited good electrical test performances. Thus, electrochemical cells constructed with an anode comprising the mixture of graphene oxide and silicon formulation of the embodiment of the present invention exhibited good charge/discharge voltage and cell capacity electrical cell performance characteristics without anode detachment or delamination. The above detailed description and examples are intended for purposes of illustrating the invention and are not to be construed as limited.

What is claimed is:

1. An electrode, comprising:
   a) a first active electrode material comprising graphene or graphene oxide, wherein at least a portion of the graphene or graphene oxide comprises defect pores formed by carbon vacancies;
   b) a second active electrode material combined with the first active electrode material; and
   c) a non-active material portion comprising carbon, wherein the electrode contains no binder residue.

2. The electrode of claim 1 wherein the second active electrode material is selected from the group consisting of silicon, silicon oxide, tin, tin oxide, antimony, aluminum, silver, germanium, gallium, magnesium, zinc, lead, bismuth, carbon, titanium oxide, lithium titanium oxide, and combinations thereof.

3. The electrode of claim 1 wherein the first active electrode material comprises from about 28 weight percent to about 70 weight percent of the electrode composition, the second active electrode material comprises from about 30 weight percent to about 70 weight percent of the electrode composition, and the non-active material portion comprises the remainder.

4. The electrode of claim 1 wherein the non-active carbon material comprises amorphous carbon.

5. The electrode of claim 1 further comprising a porosity of 40 percent or less.

6. The electrode of claim 1 wherein the first active electrode material comprises a particle size that ranges from about 0.5 μm to about 5 μm.

7. The electrode of claim 6 wherein the first active electrode material comprises a particle size that ranges from about 5 μm to about 25 μm.

8. A method of fabricating an electrode, comprising:
   providing a substrate having a surface;
   providing an electrode slurry comprising a first active electrode material comprising graphene or graphene oxide, wherein at least a portion of the graphene or graphene oxide comprises defect pores formed by carbon vacancies, a second active electrode material, a dispersant and a first solvent; and
   applying the electrode slurry to the substrate surface.

9. The method of claim 8 wherein the second active electrode material is selected from the group consisting of silicon, silicon oxide, tin, tin oxide, antimony, aluminum, silver, germanium, gallium, magnesium, zinc, lead, bismuth, carbon, titanium oxide, lithium titanium oxide, and combinations thereof.

10. The method of claim 8 including forming the electrode having a porosity of 40 percent or less.

11. The method of claim 8 wherein the dispersant is selected from the group consisting of glycol ethers, block copolymers derived from ethylene oxide and propylene oxide, acetylenic diols, sodium dodecanoate, alkanolamide, lanolin, polyvinylpyrrolidone, sodium alkyl sulfate, sodium alkyl sulfonate, lecithin, polyacrylate, sodium silicate, polyethoxy, and combinations thereof.

12. The method of claim 8 wherein the first solvent is selected from the group consisting of a polar aprotic solvent, water, ethanol, isopropyl alcohol, ethyl acetate, ethylene glycol, N-methylolpyrrolidone, and combinations thereof.

13. The method of claim 8 including applying a primer coat comprised of an adhesive agent prior to applying the electrode slurry.

14. The method of claim 13 wherein the adhesive agent is selected from the group consisting of titanium chelates, titanium phosphate complexes, butyl titanium phosphate, titanate esters, diisopropoxy titanium bis(ethyl-3-oxobutanoate, isopropoxy titanium acetylacetonate, polyvinylpyrrolidone, nitrocellulose and combinations thereof.

15. The method of claim 8 further comprising: mixing the first active electrode material with the first solvent thereby forming a first active electrode material suspension; combining the second active electrode material with the first active electrode material suspension; and combining a dispersant solution mixture comprising the dispersant and a second solvent with the first active electrode material suspension to form the electrode slurry.

16. The method of claim 15 wherein the first active electrode material suspension comprises from about 0.5 weight percent to about 2.5 weight percent graphene oxide, the remainder comprising the first solvent; and wherein the dispersant solution mixture comprises from about 3 weight percent to about 6 weight dispersant, the remainder comprising the second solvent.

17. The method of claim 15 wherein at least one of the first and second solvents is selected from the group consisting of a polar aprotic solvent, water, ethanol, isopropyl alcohol, ethyl acetate, ethylene glycol, N-methylolpyrrolidone, and combinations thereof.

18. The method of claim 8 further comprising heat treating the electrode slurry coated substrate at a temperature ranging from about 600° C. to about 800° C.

19. The method of claim 8 further comprising vacuum filtering the electrode slurry prior to applying the electrode slurry to the substrate surface.

20. An electrochemical cell, comprising:
   a) a negative electrode comprising:
      i) a first active electrode material comprising graphene or graphene oxide, wherein at least a portion of the graphene or graphene oxide comprises defect pores formed by carbon vacancies;
      ii) a second active electrode material combined with the first active electrode material;
      iii) a non-active material portion comprising carbon; and
      iv) wherein the negative electrode contains no binder residue;
   b) a positive electrode comprising a positive active electrode material having a lithium constituent; and
   c) an ionically conductive electrolyte solution.

21. The electrochemical cell of claim 20 wherein the second active electrode material is selected from the group consisting of silicon, silicon oxide, tin, tin oxide, antimony, aluminum, silver, germanium, gallium, magnesium, zinc, lead, bismuth, carbon, titanium oxide, lithium titanium oxide, and combinations thereof.

22. The electrochemical cell of claim 20 wherein the first active electrode material comprises from about 28 weight percent to about 70 weight percent of the electrode composition, the second active electrode material comprises from about 30 weight percent to about 70 weight percent of the electrode composition, and the non-active material portion comprises the remainder.

23. The electrochemical cell of claim 20 wherein the negative electrode comprises a porosity of 40 percent or less.

24. The electrochemical cell of claim 20 wherein the cell is capable of exhibiting at least about 500 mAh/cc.

* * * * *